C. W. SHEPARD & H. W. PAYNE.
ENGINE ATTACHMENT.
APPLICATION FILED APR. 2, 1915.

1,161,538.

Patented Nov. 23, 1915.

WITNESSES:

INVENTORS
CHARLES W. SHEPARD,
HARRY W. PAYNE,
BY Munn & Co.
ATTORNEYS

UNITED STATES PATENT OFFICE.

CHARLES W. SHEPARD AND HARRY W. PAYNE, OF GLOBE, ARIZONA.

ENGINE ATTACHMENT.

1,161,538. Specification of Letters Patent. Patented Nov. 23, 1915.

Application filed April 2, 1915. Serial No. 18,712.

*To all whom it may concern:*

Be it known that we, CHARLES W. SHEPARD and HARRY W. PAYNE, citizens of the United States, and residents of Globe, in the county of Gila and State of Arizona, have made certain new and useful Improvements in Engine Attachments, of which the following is a specification.

Our invention is an improvement in engine attachments and the invention has for its object to provide an attachment of the character specified adapted to utilize the pressure of the exhaust gases from an explosion engine, for generating electricity for lighting and starting.

Figure 1:
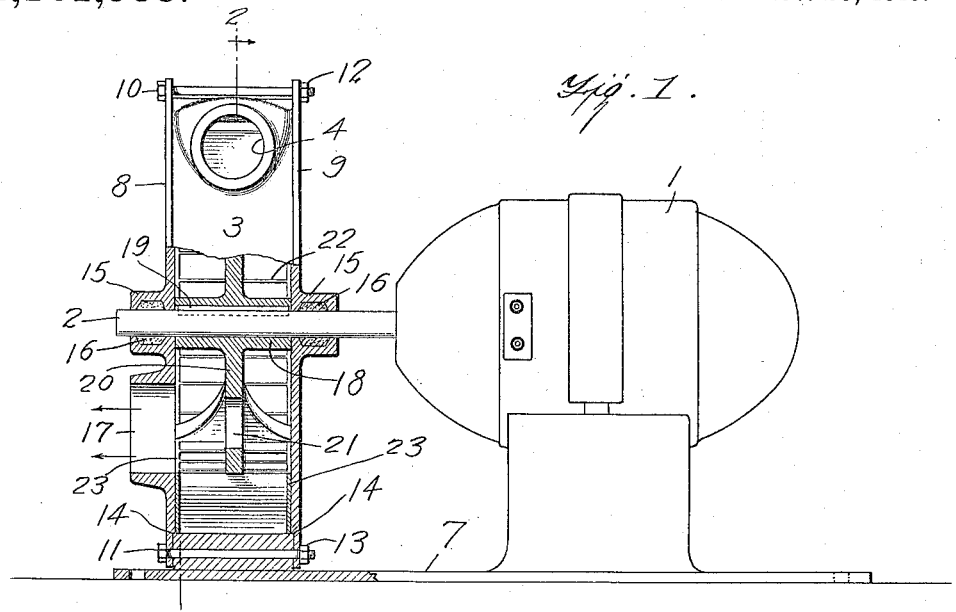
Figure 2:
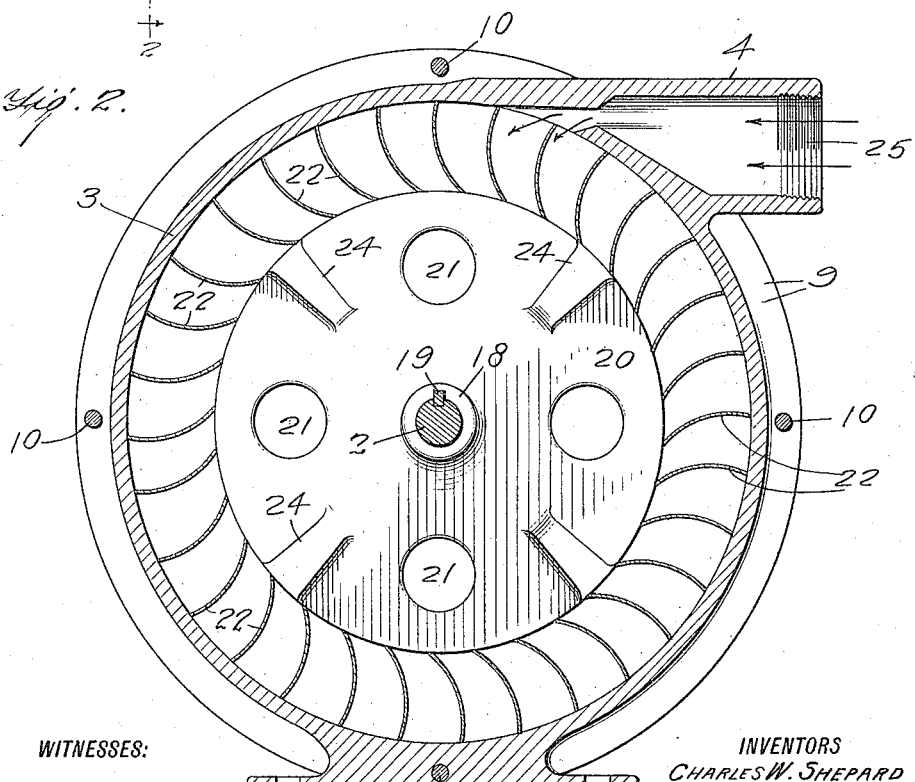

In the drawings: Figure 1 is a longitudinal vertical section of the turbine, and Fig. 2 is an enlarged section on the line 2—2 of Fig. 1, looking in the direction of the arrows adjacent to the line.

The present embodiment of the invention is shown in connection with a generator 1 of ordinary form for generating electricity, and the engine is mounted on the shaft 2 of the generator, the said shaft being extended for this purpose. The engine comprises a ring casing 3, having a tangential inlet 4 at its top and having a base 5 at its bottom, the base being provided with openings 6 at its ends, for permitting the base to be secured to the supporting base 7 of the generator 1.

The opposite sides of the ring are closed by heads 8 and 9 respectively, the heads fitting against the opposite ends of the ring, and the heads are secured to the ring by means of bolts 10 and 11. The heads 8 and 9 are of greater diameter than the external diameter of the ring and extend beyond the ring and the bolts 10 are passed through registering openings in the heads, the said openings being outside the ring. The bolts 10 are engaged by nuts 12 to clamp the heads together, and the bolt 11 is passed through the base as well as through the heads, and is engaged by a nut 13 to clamp the heads in place.

It will be noted from an inspection of Fig. 1 that the inner surfaces of the heads 8 and 9 are rabbeted or counterbored to receive the ring as indicated at 14. The heads 8 and 9 have central bearings 15 for the shaft 2 and it will be noted that each bearing is chambered to receive a packing 16 for the shaft. The head 8 is provided with an outlet 17 below the bearing 15, and a bearing sleeve or hub 18 is secured to the shaft within the casing constituted by the ring 3 and the heads 8 and 9. The sleeve or hub is connected to the shaft by means of a key 19, and it will be noted that the sleeve or hub extends the full space between the inner surface of the heads 8 and 9.

The hub or bearing sleeve 18 is provided with a radial web 20 at approximately its center and the web is provided with openings 21 at spaced intervals for decreasing weight and for equalizing the pressure on the opposite sides of the web. The web does not extend to the inner surface of the ring casing 3 and blades 22 are connected with the web at the periphery thereof, the said blades being arranged in spaced relation. All of the blades are curved radially with respect to the casing, and they are arranged with their concave faces rearwardly, the blades being similarly arranged as shown.

The blades extend between the inner surfaces of the heads, and from the periphery of the web to the interior of the casing 3, the free edges of the blades moving close to the said inner surface. The ends of the blades are connected adjacent to each head 8 and 9 by a web 23, the said webs 23 being of ring shape. Between each adjacent pair of openings the web is provided with braces or reinforcements in the form of buttresses 24, the said buttresses extending from the inner surface of the openings 21 to the inner edges of the blades on each side, and the buttresses are arranged in pairs, the members of each pair being on opposite sides of the web 20. As shown at 25 the inlet nipple 4 is internally threaded for engagement by a discharge pipe leading from the exhaust of the engine for delivering the exhaust to the casing.

The casing 3—8—9 is a stator or casing for the motor and the rotor is constituted by the blades, the webs, and the hub, and since this rotor is connected directly to the shaft 2 it will be obvious that when the rotor is rotating the said shaft will be turned to turn the generator.

The exhaust products from the engine are delivered to the nipple 4 and the said products pass, as indicated by the arrows in Fig. 2, into the interior of the casing impinging against the concave surfaces of the blades 22. As the said products strike the blades the blades will be impelled forwardly and the rotor will be rotated, thus rotating the generator. The waste products from the engines of automobiles and other motor vehicles are, as a rule, wasted, being delivered to the atmosphere either with or without a muffler.

In the present instance the products are delivered directly to the rotary motor, driving the same, and causing the motor to drive the generator to generate electricity which may be used for lighting the vehicle or for starting the engine.

We claim:—

1. An attachment for explosive engines, comprising a casing of approximately cylindrical form and composed of a ring having a base and having a tangential inlet at the opposite side from the base, and heads closing the ends of the ring, each head having a bearing at the axis of the ring, and one head having an exhaust below the bearing, means for clamping the heads on the ring, a generator arranged with its axis in alinement with the axis of the casing, the shaft of the generator being extended and being journaled in the bearings, a hub keyed to the shaft in the casing and provided with a radial web intermediate its ends, said web having transverse openings, a series of blades arranged between the periphery of the web and the interior of the ring and extending from the inner surface of one head to the inner surface of the other, said blades being curved radially with respect to the casing and being similarly arranged with their concave faces toward the inlet, and a ring connecting the blades at each end of the said blades, the inlet of the casing being adapted for connection with the exhaust of an engine.

2. An attachment for explosion engines, comprising a casing of approximately cylindrical form and consisting of a ring having a base and having an inlet, and heads closing the ends of the ring, each head having a bearing at the axis of the ring, and one head having an exhaust, means for clamping the heads on the ring, a generator arranged with its axis in alinement with the axis of the casing, the shaft of the generator being extended and journaled in the bearings of the heads, a hub keyed to the shaft in the casing, and having a series of blades supported thereby, said blades extending approximately radial to the hub and moving in contact with the interior of the ring, a ring connecting the blades at each end of the said blades and moving in contact with the inner surface of the adjacent ring, the inlet of the casing being adapted for connection with the exhaust of an engine.

CHARLES W. SHEPARD.
HARRY W. PAYNE.

Witnesses:
 DAN R. WILLIAMSON,
 JOSEPH MAST.

Copies of this patent may be obtained for five cents each, by addressing the "Commissioner of Patents, Washington, D. C."